July 9, 1935.  C. F. BARRITT  2,007,439
COOLING SYSTEM FOR BREAD WRAPPING MACHINES
Filed Aug. 29, 1932  3 Sheets-Sheet 1
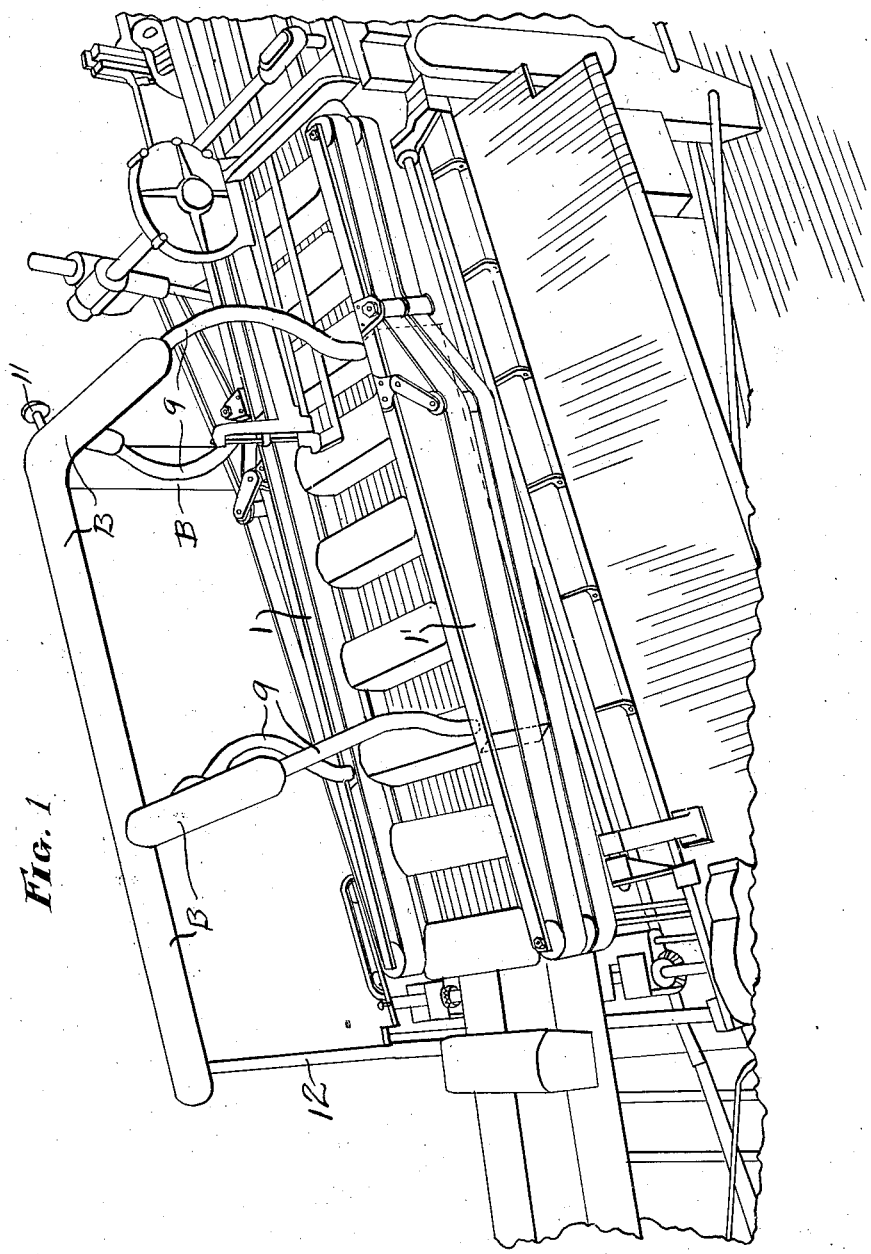
INVENTOR.
Clay F. Barritt
BY
ATTORNEY.

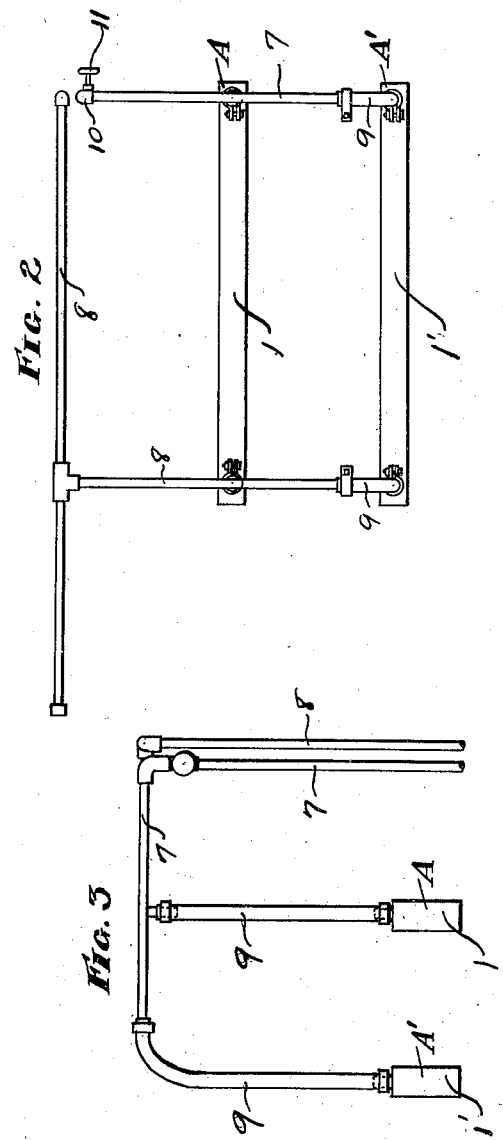

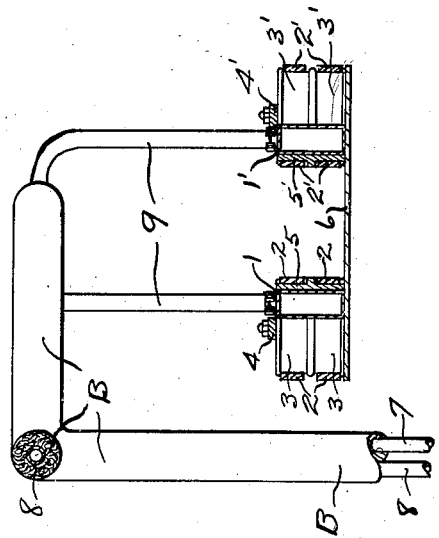
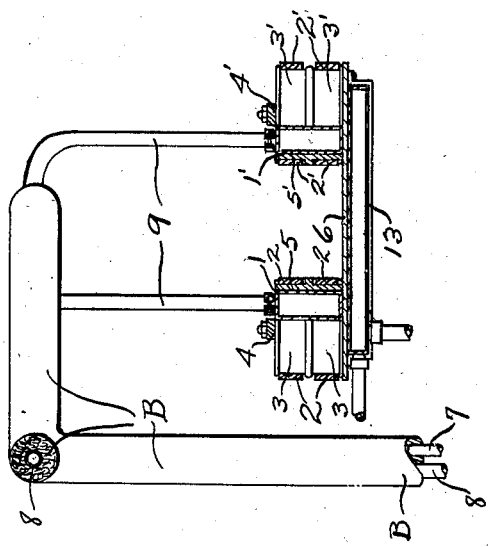

UNITED STATES PATENT OFFICE 2,007,439

COOLING SYSTEM FOR BREAD WRAPPING MACHINES

Clay F. Barritt, Wichita, Kans., assignor of one-half to George Rushton Baking Company, Wichita, Kans.

Application August 29, 1932, Serial No. 630,865

2 Claims. (Cl. 93—2)

My invention relates to a cooling system for bread wrapping machines.

The object of my invention is to provide a cooling means for the wrapper folds as the bread is conveyed from the machine.

A further object of my invention is to provide a cooling means for the waxed wrapper for bread by the circulation of fluid thru tanks in close proximity to the folds of the bread wrapper as the bread is conveyed along the delivery table.

A still further object of my invention is to provide a simple and inexpensive cooling system for bread wrapping machines that is efficient in solidifying the molten condition of the wax saturated wrapper as the bread is delivered from the machine, the cooling method is performed by the circulation of brine or other fluid thru the tanks carried by the delivery elements of the bread wrapping machine.

These and other objects will hereinafter be more fully explained, reference being had to the accompanying drawings forming a part of this specification, and in which like characters will apply to like parts in the different views, and in which:—

Fig. 1 is a perspective view of the delivery portion of the bread wrapping machine, other portions of the machine removed.

Fig. 2 is a plan view of the pipe system and cooling tanks.

Fig. 3 is an end view of Fig. 2.

Fig. 4 is an opposite end view, the pipes being insulated, partly in section thru the tanks and belt conveyors.

Fig. 5 is a similar view to Fig. 4, but embodying a tank as cooling means for the delivery table, the tank being attached to the under side of the table.

In the wrapping of bread much difficulty has been experienced due to the lapping folds of the waxed paper failing to adhere properly after the heating process has been applied to cause adhesion of the wax saturating the wrapping paper, and due to high temperature, either climatic or artificially produced within the factory, the wax is extremely slow to properly seal by hardening the same. To overcome such difficulty, I have arranged in combination with a standard make of bread wrapping machine, a system for cooling that portion of the machine that conveys the loaves of bread wrapped compressing the folds of the wrapper tightly for adhesion cooling the same which quickly occurs under this process which I herein set forth consisting of a pair of tanks 1 and 1', each positioned within the folds of their respective belts 2 and 2' that are carried by the pulleys 3 and 3'. Said pulleys are trunnioned on vertically disposed spindles, each pair having a properly arranged frame 4 to move to and from each other carrying the belts therewith, and each frame having a plate 5 and 5'. The frame, pulleys, and belts being elements of the bread wrapping machine, and the said elements are adapted to operate above the plane of the table 6 that is also a component part of the said machine, and upon which the loaves of wrapped bread rest as they are conveyed therealong by the belts.

It will be understood that the said tanks 1 and 1' are likewise carried by their respective frames in their movement to and from each other, which movement is to properly space the belt elements apart with respect to loaves of bread of varying length.

It will also be understood that the said tanks are in close contact with their respective plates 5 and 5', by which means the said plates are cooled, and in turn the belts are also cooled by their sliding contact on the plates, by which method the folds of the bread wrapper in contact with the belts and plates are cooled causing rapid and efficient adhesion of the same.

The manner of conveying fluid of low temperature thru each of the said tanks is thru the medium of pipe 7 as a lead from a source of supply, preferably an ice plant that is commonly employed by baking institutions, while in my bakery brine is drawn from the refrigerating plant discharging the same thru the said pipe 7 at corresponding ends of the tanks as at A and A' passing thru each tank and discharging thru pipe 8 that may connect with the sewer or other means of disposal.

In view of the fact that the said tanks are movable to and from each other, I have arranged a flexible hose like connection 9 at each end thereof to their respective pipes 7 and 8 by a slip joint arrangement properly clamped to avoid leakage. To control the flow of fluid a valve 10 controlled by a wheel 11 is placed in the pipe 7 as shown in Figs. 1, 2, and 3, the purpose of which is to discontinue the circulation during the idleness of the machine, or for repairs.

In Figs. 1, 4, and 5 are shown the pipes 7 and 8 covered with insulation B, by which means condensation is avoided relieving possibility and annoyance of water dripping from the pipes when the same are exposed to a higher degree of atmospheric temperature.

The said pipe system is secured in working relation to the bread wrapping machine by a standard 12, the lower end of which is attached to the machine while the upper end is secured to the rearwardly extended portion of pipe 8, the other ends being carried by the vertically disposed portion of each pipe.

In some instances, the bed along which the wrapped bread is conveyed may be cooled by a tank 13 closely engaging on the underside of the bed and being connected to the said pipe system, by which means the longitudinal lap of the bread wrapper will adhere more readily.

While I have specifically mentioned brine as a cooling fluid and the source from which it is taken I do not wish to be confined to such alone as other fluids and source of supply, also the method of circulation may be employed and such other modifications may be employed to adapt the cooling system to different makes of bread wrapping machines as lie within the scope of the appended claims.

Having fully described my invention, what I claim as new and desire to secure by Letters Patent is:-

1. In combination a bread wrapping machine having a table forming a runway for the passage of wrapped bread, conveyors arranged on opposite sides of the runway, each conveyor comprising a pair of belts, rigidly mounted plates positioned in back of each pair of belts over which said belts slide, refrigerating tanks positioned in back of each plate for cooling the belts during their passage over the plates, said tanks engaging the plates for the major portion of their length, a refrigerant tank mounted beneath the runway and in direct contact with the bottom thereof and flexible refrigerant circulating conduits connected with the several tanks.

2. In combination a bread wrapping machine having a table forming a runway, conveyor belts in working relation to the table and positioned upon opposite sides of the runway, rollers for supporting the travel of the belts, each conveyor comprising a pair of separated belts, a backing plate for each pair of belts, a rib formed on each plate and projecting between the separated belts, said plates held in fixed position with respect to the rollers, refrigerating tanks positioned in back of each plate and in contacting relation thereto, said tanks being relatively long and of a width equal to the combined width of the belts, said tanks engaging the plates for the major portion of their length, flexible fluid conduits leading to each tank for conducting a refrigerant thereto, a refrigerating tank positioned beneath and in contacting relation to the bottom of the runway and of a width equal to said runway and refrigerant conducting conduits leading to said last named tank.

CLAY F. BARRITT.